United States Patent
Son et al.

(10) Patent No.: US 8,831,786 B2
(45) Date of Patent: Sep. 9, 2014

(54) SYSTEM, APPARATUS AND METHOD FOR CONTROLLING CHARGE AND DISCHARGE OF ELECTRIC VEHICLE

(75) Inventors: Dong Min Son, Suwon (KR); Jae Seong Park, Daejeon (KR); Jung Hwan Oh, Seoul (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 162 days.

(21) Appl. No.: 13/101,030

(22) Filed: May 4, 2011

(65) Prior Publication Data

US 2011/0282513 A1 Nov. 17, 2011

(30) Foreign Application Priority Data

May 13, 2010 (KR) .................. 10-2010-0045123

(51) Int. Cl.
| | |
|---|---|
| G05D 3/12 | (2006.01) |
| G06F 17/00 | (2006.01) |
| B60L 11/18 | (2006.01) |
| H02J 3/00 | (2006.01) |
| H01M 10/44 | (2006.01) |
| H02J 3/32 | (2006.01) |

(52) U.S. Cl.
CPC .. *H02J 3/32* (2013.01); *Y04S 30/14* (2013.01); *Y02T 90/128* (2013.01); *B60L 11/1842* (2013.01); *H02J 3/008* (2013.01); *Y02E 60/721* (2013.01); *Y02T 90/14* (2013.01); *Y02E 60/12* (2013.01); *B60L 2250/10* (2013.01); *Y02T 90/121* (2013.01); *Y02T 10/7005* (2013.01); *Y02T 90/169* (2013.01); *B60L 2230/16* (2013.01); *B60L 11/1816* (2013.01); *B60L 11/1838* (2013.01); *H01M 10/44* (2013.01); *Y04S 50/10* (2013.01); *Y02T 10/7088* (2013.01); *B60L 11/184* (2013.01); *Y04S 10/126* (2013.01); *Y02T 90/163* (2013.01)
USPC ........... 700/291; 700/295; 700/297; 320/109; 705/412

(58) Field of Classification Search
CPC . Y02T 10/7088; Y02T 90/128; Y02T 90/163; Y02T 90/16; Y02T 10/7044; Y02T 90/168; Y02T 10/7283; Y02T 10/92; Y02T 10/84; Y04S 10/126; Y04S 50/10; Y04S 50/12; Y04S 30/12; Y04S 50/14
See application file for complete search history.

(56) References Cited

U.S. PATENT DOCUMENTS

| | | | | |
|---|---|---|---|---|
| 8,314,587 B2 * | 11/2012 | White et al. | .................. | 320/103 |
| 2003/0052647 A1 * | 3/2003 | Yoshida et al. | ............... | 320/125 |

(Continued)

FOREIGN PATENT DOCUMENTS

| | | |
|---|---|---|
| JP | 7-236204 | 9/1995 |
| JP | 10-271694 | 10/1998 |

(Continued)

OTHER PUBLICATIONS

Korean Intellectual Property Office Application Serial No. 10-2010-0045123, Office Action dated Aug. 11, 2011, 6 pages.

(Continued)

*Primary Examiner* — Sean Shechtman
(74) *Attorney, Agent, or Firm* — Lee, Hong, Degerman, Kang & Waimey

(57) ABSTRACT

Disclosed is a technique using an electric vehicle. The technique enables a user to set the operation plan of the electric vehicle and the price of electricity used to charge/discharge an electric vehicle battery. The electric vehicle battery is charged, or the electric energy charged in the electric vehicle battery is collected, according to the set information. Accordingly, it is possible to charge the electric vehicle battery at the price approved by the user under variable pricing of electric energy. When the price of electricity increases or there is no operation plan of the electric vehicle, the electric energy stored in the battery is collected to operate electric devices or resell the stored electric energy to an electric power company, thereby obtaining economic benefit. As the spread of electric vehicles are extended, it can be expected to save a considerable amount of electric energy throughout the whole society.

7 Claims, 10 Drawing Sheets

(56) References Cited

U.S. PATENT DOCUMENTS

| | | | | |
|---|---|---|---|---|
| 2003/0218447 | A1* | 11/2003 | Coates et al. | 320/134 |
| 2004/0251870 | A1* | 12/2004 | Ueda et al. | 320/104 |
| 2008/0136371 | A1* | 6/2008 | Sutardja | 320/109 |
| 2008/0281732 | A1* | 11/2008 | Yamada | 705/30 |
| 2009/0021218 | A1* | 1/2009 | Kelty et al. | 320/137 |
| 2009/0030712 | A1* | 1/2009 | Bogolea et al. | 705/1 |
| 2009/0304101 | A1* | 12/2009 | LoPorto et al. | 375/260 |
| 2010/0010685 | A1* | 1/2010 | Kang | 700/296 |
| 2010/0017045 | A1* | 1/2010 | Nesler et al. | 700/296 |
| 2010/0017249 | A1* | 1/2010 | Fincham et al. | 705/8 |
| 2010/0045232 | A1* | 2/2010 | Chen et al. | 320/109 |
| 2010/0188043 | A1* | 7/2010 | Kelty et al. | 320/109 |
| 2010/0262566 | A1* | 10/2010 | Yamamoto | 705/412 |
| 2010/0318252 | A1* | 12/2010 | Izumi | 701/22 |
| 2011/0178959 | A1* | 7/2011 | Nakajima et al. | 705/412 |
| 2012/0007553 | A1* | 1/2012 | Ichikawa et al. | 320/109 |
| 2012/0256594 | A1* | 10/2012 | Bisbing et al. | 320/134 |

FOREIGN PATENT DOCUMENTS

| | | |
|---|---|---|
| JP | 2001-258177 | 9/2001 |
| JP | 2002-233053 | 8/2002 |
| JP | 2003-339120 | 11/2003 |
| JP | 2005-515741 | 5/2005 |
| JP | 2005-515747 | 5/2005 |
| JP | 2007-185083 | 7/2007 |
| JP | 2007-202383 | 8/2007 |
| JP | 2007-252117 | 9/2007 |
| JP | 2007-330083 | 12/2007 |
| JP | 2008-141925 | 6/2008 |
| JP | 2008-182851 | 8/2008 |
| JP | 2009-152136 | 7/2009 |
| JP | 2009-171690 | 7/2009 |
| JP | 2009-254052 | 10/2009 |
| JP | 2012-505629 | 3/2012 |
| KR | 10-2008-0080864 | 9/2008 |

OTHER PUBLICATIONS

Japan Patent Office Application Serial No. 2011-107345, Office Action dated Dec. 18, 2012, 4 pages.

The State Intellectual Property Office of the People's Republic of China Application Serial No. 201110129962.3, Office Action dated Jul. 3, 2013, 8 pages.

* cited by examiner

FIG. 6
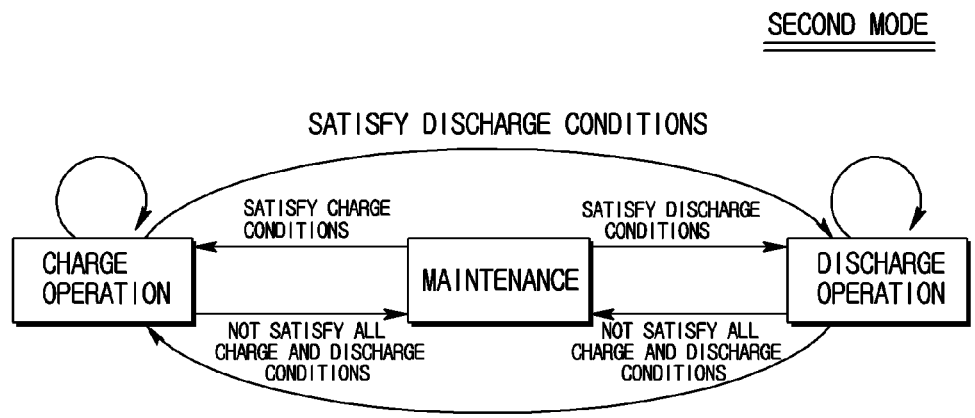
(6a)
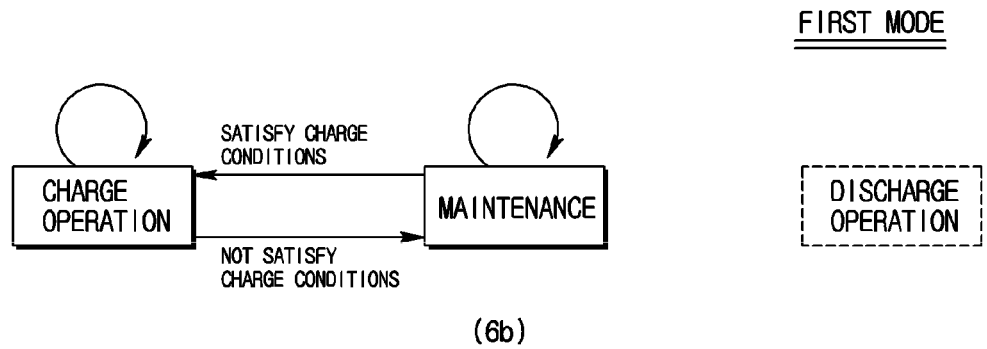
(6b)
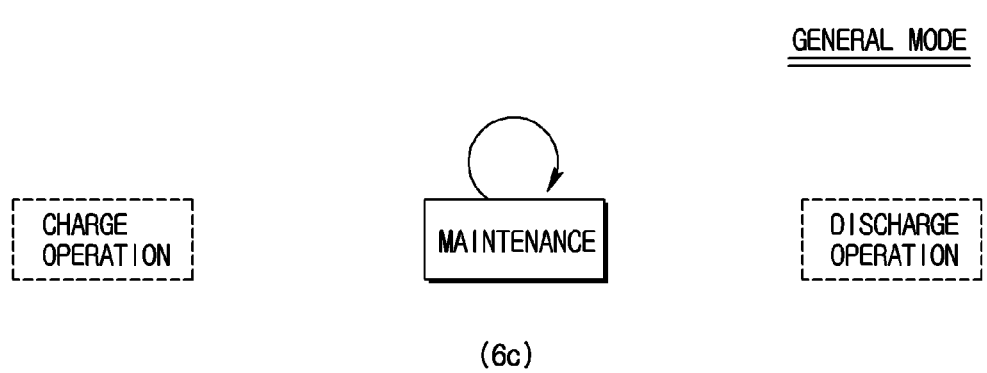
(6c)

FIG. 9
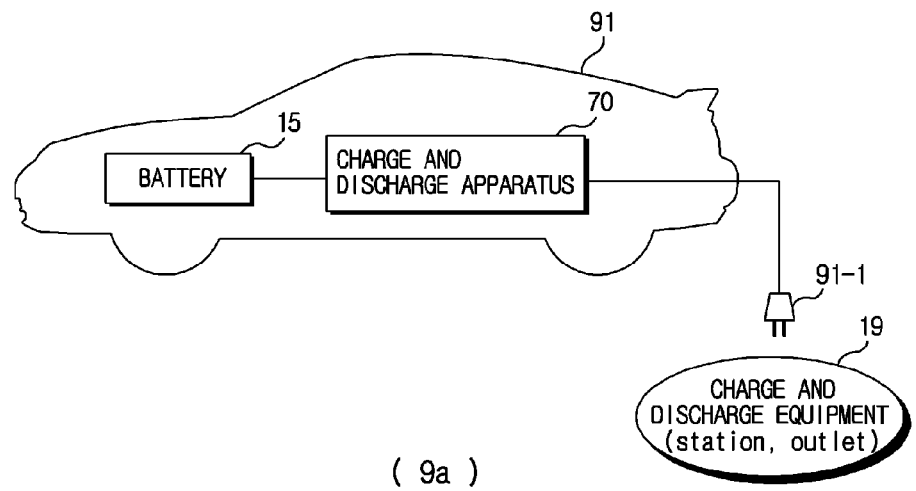
(9a)
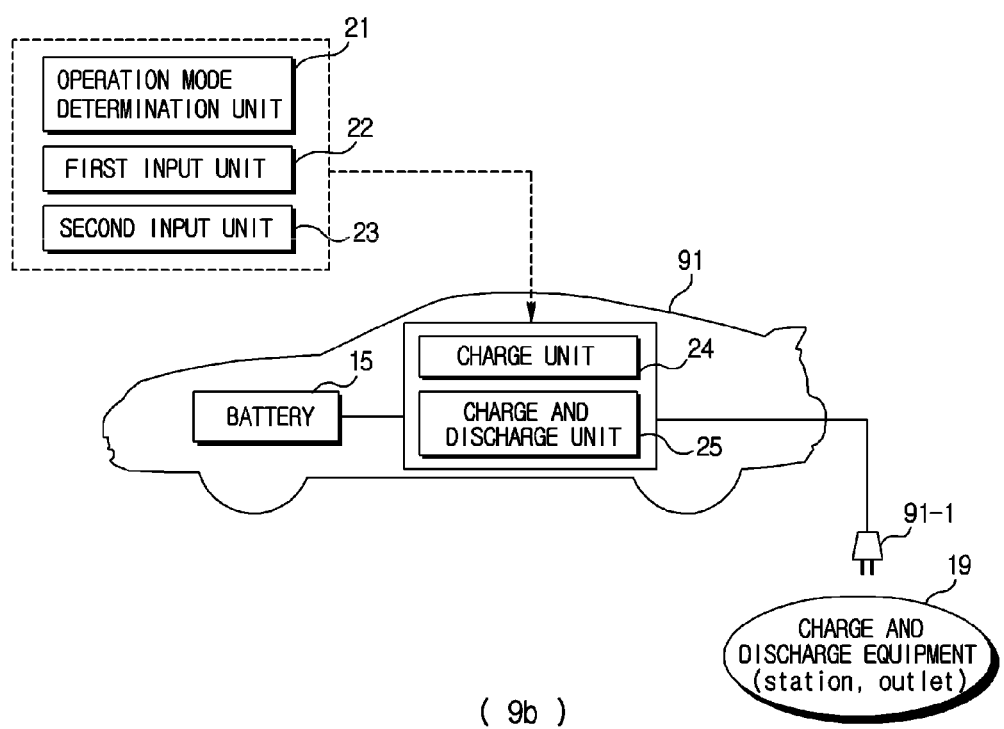
(9b)

FIG. 11
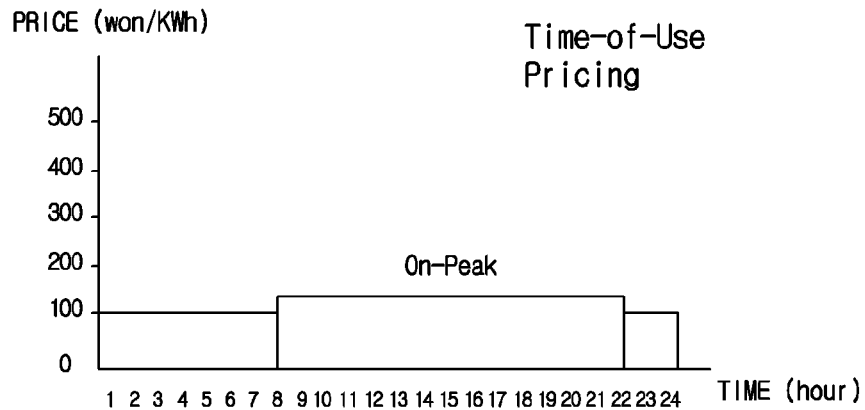
( 11a )
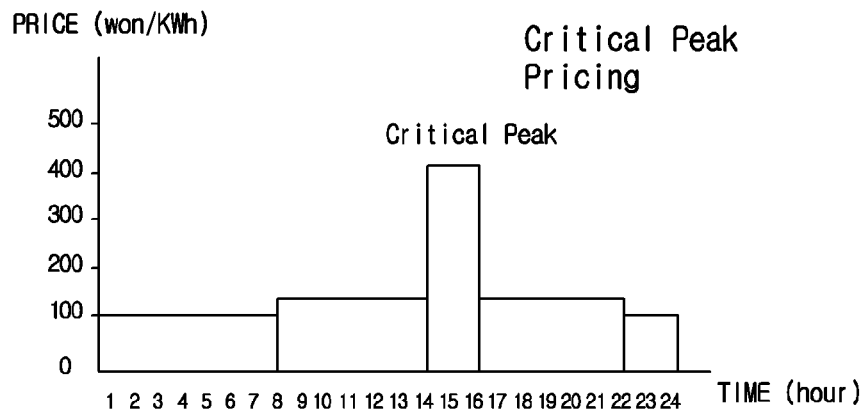
( 11b )
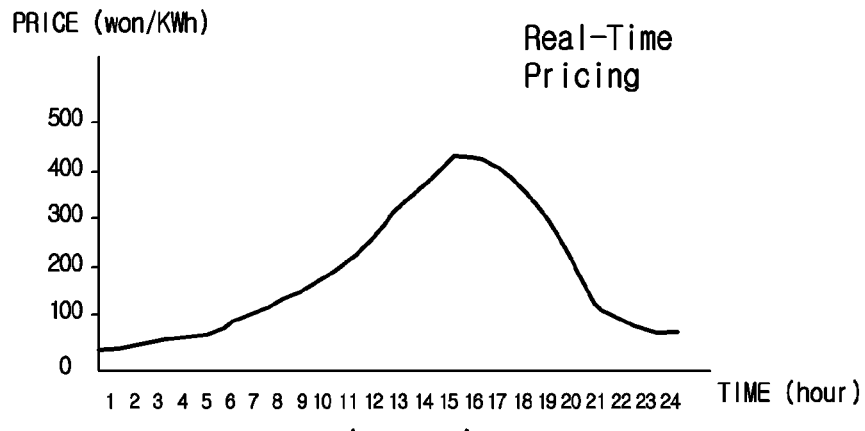
( 11c )

SYSTEM, APPARATUS AND METHOD FOR CONTROLLING CHARGE AND DISCHARGE OF ELECTRIC VEHICLE

CROSS-REFERENCE TO RELATED APPLICATION

This application claims the benefit of earlier filing date and right of priority to Korean Patent Application No. 10-2010-0045123, filed May 13, 2010, the contents of which is hereby incorporated herein by reference in its entirety.

BACKGROUND OF THE INVENTION

1. Field of the Invention

An aspect of the present invention relates to an electric vehicle, and more specifically, to a system, apparatus and method for controlling charge and discharge of an electric vehicle, which allows an electric vehicle user to charge an electric vehicle battery at a proper time or to use the electric vehicle battery as an energy supply source according to the operation scheme of the electric vehicle or price of electricity, so that the electric vehicle can be more economically used.

2. Description of the Prior Art

Vehicles using fossil energy such as gasoline, light oil, LPG and LNG have been mainly used up to the present. However, it is expected that demands on electric vehicles will remarkably increase due to exhaustion of fossil fuel.

Since the electric vehicles also use electric energy, continuous interest in energy saving should be required.

As the society is developing to a smart grid society and the variable pricing system of electricity is applied, development of various plans is required to more effectively use electric vehicles that are one of the most important loads.

SUMMARY OF THE INVENTION

Embodiments of the present invention provide a system, an apparatus and a method for controlling charge and discharge of an electric vehicle, which allows an electric vehicle user to charge an electric vehicle battery at a proper time or to use the electric vehicle battery as an energy supply source, if necessary, according to the operation scheme of the electric vehicle or price of electricity, so that the electric vehicle can be more effectively used.

According to an aspect of the present invention, there is provided a system for controlling charge and discharge of an electric vehicle, the system including: an operation mode determination unit configured to determine the presence of operation after an electric vehicle battery is charged from an electric vehicle user; a first input unit configured to receive a price of electricity required in the charge of the electric vehicle battery, inputted from the electric vehicle user; a second input unit configured to receive a price of electricity generated in the discharge of the electric vehicle battery, inputted from the electric vehicle user; a charge unit configured to charge the electric vehicle battery when the price of electricity is less than that inputted through the first input unit, in a first mode in which the electric vehicle is operated after the electric vehicle battery is charged; and a charge and discharge unit configured to charge the electric vehicle battery when the price of electricity is less than that inputted through the first input unit and discharge the electric vehicle battery when the price of electricity exceeds that inputted through the second input unit, in a second mode in which the electric vehicle is not operated after the electric vehicle battery is charged.

The system may further include a reception unit configured to enable the user to input information on the price of electricity based on time.

The system may further include a reception unit configured to receive the information on the price of electricity based on time from a central server that transmits the information on the price of electricity through a communication network.

According to an aspect of the present invention, there is provided an apparatus for controlling charge and discharge of an electric vehicle, the apparatus including: an operation mode determination unit configured to determine the presence of operation after an electric vehicle battery is charged from an electric vehicle user; a first input unit configured to receive a price of electricity required in the charge of the electric vehicle battery, inputted from the electric vehicle user; a second input unit configured to receive a price of electricity generated in the discharge of the electric vehicle battery, inputted from the electric vehicle user; a charge unit configured to charge the electric vehicle battery when the price of electricity according to the information on the price of electricity, received through the reception unit, is less than that inputted through the first input unit, in a first mode in which the electric vehicle is operated after the electric vehicle battery is charged; and a charge and discharge unit configured to charge the electric vehicle battery when the price of electricity according to the information on the price of electricity, received through the reception unit, is less than that inputted through the first input unit and discharge the electric vehicle battery when the received price of electricity exceeds that inputted through the second input unit, in a second mode in which the electric vehicle is not operated after the electric vehicle battery is charged.

The apparatus may further include a reception unit configured to enable the user to input information on the price of electricity based on time.

The apparatus may further include a reception unit configured to receive the information on the price of electricity based on time from a central server that transmits the information on the price of electricity through a communication network.

Information on the operation mode may be inputted through a user portable terminal or in home display (IHD).

The first input unit may further receive charge-amount reference information from the user. The charge unit and the charge and discharge unit may charge the electric vehicle battery according to the charge-amount reference information.

The second input unit may further receive discharge-amount reference information from the user. The charge and discharge unit may discharge the electric vehicle battery according to the discharge-amount reference information.

The system and the apparatus may further include a measurement unit configured to calculate an electricity rate in the charge or discharge of the electric vehicle battery.

The information on the electricity rate calculated by the measurement unit may be transmitted to at least one of the central server, the user portable terminal and the user IHD (In Home Display).

The measurement unit may include a smart meter.

The measurement unit may estimate at least one of electricity rates in the charge and discharge using information on the capacity of the electric vehicle battery.

The measurement unit may estimate an electricity rate to be received from an electric power company based on the information on the price of electricity, inputted through the first and second input units.

The estimated information may be transmitted to at least one of the central server, the user portable terminal and the user IHD (In Home Display).

The measurement unit may monitor whether the rate of electricity required to charge the electric vehicle battery for a specific period of time exceeds a predetermined maximum value.

Preferably, if the rate of electricity required to charge the electric vehicle battery for a specific period of time exceeds a predetermined maximum, a warning message may be transmitted to at least one of the user portable terminal and IHD (In Home Display).

According to an aspect of the present invention, there is provided a method for controlling charge and discharge of an electric vehicle, the method including: determining the presence of operation after an electric vehicle battery is charged from an electric vehicle user; receiving a price of electricity required in the charge of the electric vehicle battery, inputted from the electric vehicle user (first input step); receiving a price of electricity generated in the discharge of the electric vehicle battery, inputted from the electric vehicle user (second input step); charging the electric vehicle battery when the price of electricity is less than that inputted through the first input step, in a first mode in which the electric vehicle is operated after the electric vehicle battery is charged (charge step); and charging the electric vehicle battery when the price of electricity is less than that inputted through the first input step and discharging the electric vehicle battery when the price of electricity exceeds that inputted through the second input step, in a second mode in which the electric vehicle is not operated after the electric vehicle battery is charged (charge and discharge step).

The charge and discharge method may further include receiving the information on the price of electricity based on time from a central server that transmits the information on the price of electricity through a communication network (reception step).

Preferably, the information on the price of electricity based on time may be inputted by the user.

Preferably, the first input step may further receive charge-amount reference information from the user. Preferably, the charge step and the charge and discharge step may charge the electric vehicle battery according to the charge-amount reference information.

Preferably, the second input step may further receive discharge-amount reference information from the user. Preferably, the charge and discharge step may discharge the electric vehicle battery according to the discharge-amount reference information.

The charge and discharge method may further include calculating an electricity rate for the charge performed by the charge step and the charge and discharge step (measurement step).

Preferably, the information on the electricity rate calculated in the measurement step may be transmitted to at least one of a central server, a user portable terminal and a user IHD.

Preferably, the measurement step may be performed in a smart meter.

Preferably, the measurement step may estimate at least one of electricity rates in the charge and discharge using information on the capacity of the electric vehicle battery.

Preferably, the measurement step may estimate an electricity rate to be received from an electric power company based on the price of electricity inputted in the first input step and the second input step.

Preferably, the estimated information may be transmitted to at least one of the central server, the user portable terminal and the user IHD.

Preferably, the measurement step may monitor whether the rate of electricity required to charge the electric vehicle battery for a specific period of time exceeds a predetermined maximum value.

Preferably, if the rate of electricity required to charge the electric vehicle battery for a specific period of time exceeds a predetermined maximum value, a warning message may be transmitted to at least one of the user portable terminal and IHD.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a diagram showing states that charge and discharge are performed on an electric vehicle battery by the system according to the present invention;

FIG. 9 is a diagram illustrating various possibilities of configuring the system and apparatus according to the present invention;

FIG. 11 is a graph showing an example of the price structure of electricity related to the system and method according to the present invention.

DETAILED DESCRIPTION OF PREFERRED EMBODIMENTS

Hereinafter, preferred embodiments of the present invention will be described with reference to the accompanying drawings.

Figure 1:
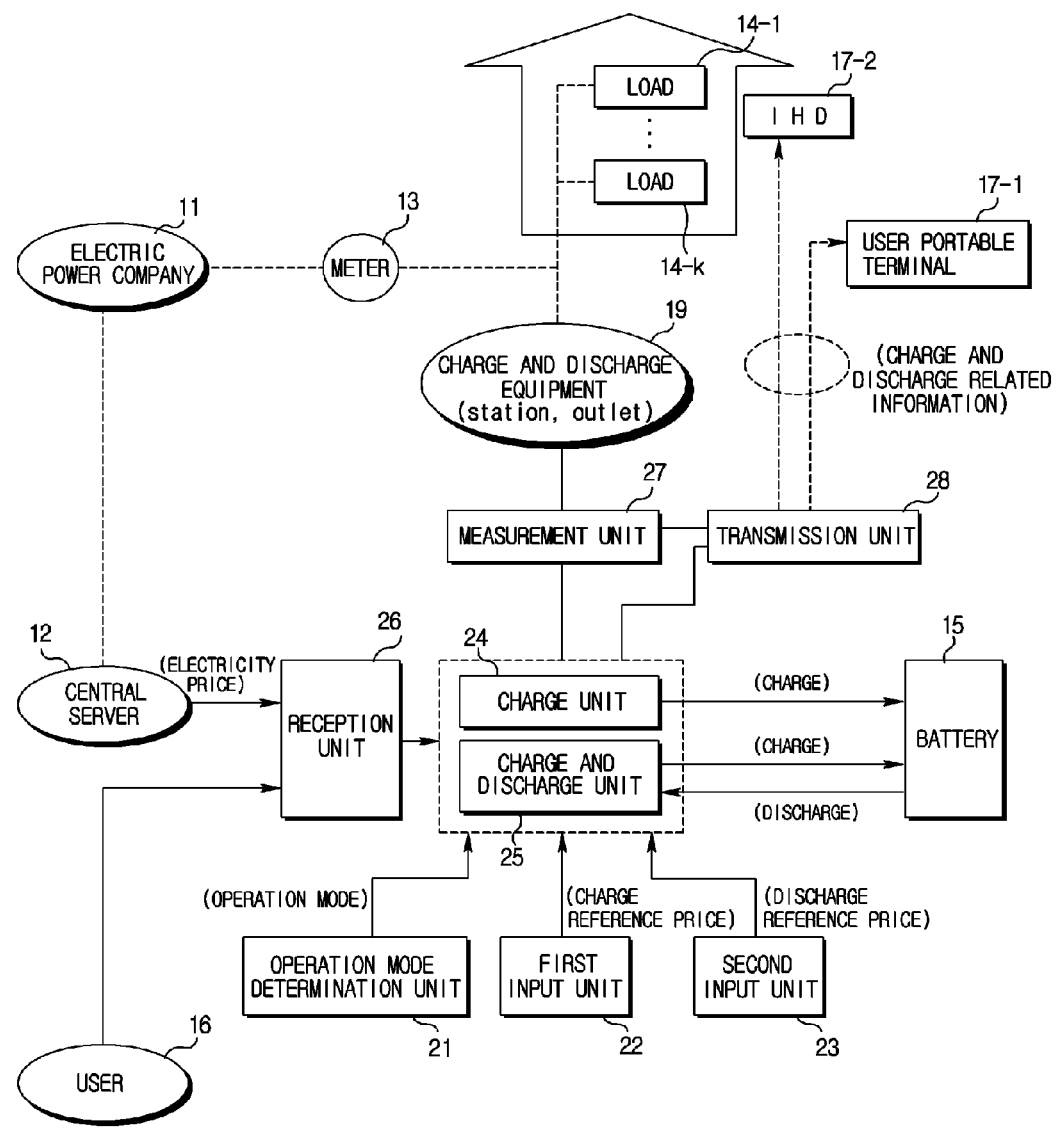
FIG. 1 is a diagram showing an embodiment of a system for controlling charge and discharge of an electric vehicle according to the present invention.

FIG. 1 illustrates an embodiment of a system for controlling charge and discharge of an electric vehicle according to the present invention. The system enables a user 16 to charge or discharge an electric vehicle battery 15 based on the price of electricity according to time and the operation scheme of the electric vehicle.

In the present invention, the term 'discharge' means that electric energy stored in the electric vehicle battery 15 is again collected.

The discharged electric energy may be used as energy for various types of loads 14-1 to 14-k, such as a TV set, an audio set and a refrigerator, which are provided to an energy consuming place such as a household or office, or may be again sold to an electric power company 11.

The electric power company 11 supplies electric energy, and the electric energy supplied from the electric power company 11 is distributed along power lines. Then, the electric energy distributed along the power lines is transformed to an appropriate voltage level through a transformer station and the like, and the electric energy transformed to the appropriate voltage level is supplied to the energy consuming place.

The price of electricity is varied depending on time under variable pricing, and a central server 12 transmits information on the varied price of electricity through a communication network.

The central server 12 is a server used for an electric power company or a provider to provide information on the price of electricity varied depending on time through a communication network. Here, the provider is qualified to provide the information on the price of electricity to each user.

The central server 12 may transmit the information on the price of electricity through various communication networks such as a wireless mesh network, a power line communication network and an Internet network.

A meter 13 is installed in the energy consuming place. The meter refers to a gauge that detects information on the amount of electricity energy used.

A charge and discharge equipment 19 is provided to the energy consuming place so as to become a path through which the electric vehicle battery 15 is charged or discharged.

The charge and discharge equipment 19 may be an outlet connected to a power source plug provided to an electric vehicle or a separate power supply (station) provided to the energy consuming place for the purpose of charging the electric vehicle.

The system according to the present invention may be variously configured according to necessity. The system includes at least an operation mode determination unit 21, a first input unit 22, a second input unit 23, a charge unit 24 and a charge and discharge unit 25.

The system may further include one or more combinations of a reception unit 26, a measurement unit 27 and a transmission unit 28.

The operation mode determination unit 21 enables the user 16 to input operation mode information according to the operation scheme of the electric vehicle.

The operation mode includes a first mode and a second mode. The first mode is a mode informing that the electric vehicle will be operated on occasion, and the second mode is a mode informing that the electricity vehicle will not operated for a quite time due to several reasons such as a business trip or a journey.

The first input unit 22 enables the user 16 to input the price of electricity, with which the electricity vehicle battery 15 is to be charged.

That is, the user 16 sets it through the first input unit 22 how much the price of electricity is to charge the electricity vehicle battery 15.

Hereinafter, the price of electricity, inputted through the first input unit 22, is referred to as a 'charge reference price.'

The second input unit 23 enables the user 16 to input the price of electricity with which the electricity vehicle battery 15 is to be discharged.

That is, the user 16 sets it through the second input unit 23 how much the price of electricity is to discharge the electricity vehicle battery 15 and use it at another place. Hereinafter, the price of electricity, inputted through the second input unit 23, is referred to as a 'discharge reference price.'

The operation mode determination unit 21, the first input unit 22 and the second input unit 23 may be variously configured as components that interface with the user.

As an example, the components may be configured so that the user inputs corresponding information through the components positioned on a front panel of the electric vehicle.

As another example, the components may be configured so that the user inputs corresponding information through the components built in a user portable terminal 17-1 or in home display (IHD) 17-2.

Information on the operation mode, the charge reference price and the discharge reference price, respectively inputted by the user through the operation mode determination unit 21, the first input unit 22 and the second input unit 23, are transferred to the charge unit 24 and the charge and discharge unit 25.

The information on the operation mode, the charge reference price and the discharge reference price may be transferred to the charge unit 24 and the charge and discharge unit 25 through various paths. The information on the operation mode, the charge reference price and the discharge reference price may be immediately transferred to the charge unit 24 and the charge and discharge unit 25 when the user inputs the corresponding information, or may be accessed when the corresponding information is required.

The charge unit 24 charges the electric vehicle battery 15 based on the information on the operation mode determined through the operation mode determination unit 21, the charge reference price inputted through the first input unit 22 and the price of electricity according to time.

The charge unit 24 may include a device that transforms AC current inputted through the charge and discharge equipment 19 into DC current and charges the battery 15 using the DC current, or may be configured to instruct a battery charge device generally provided to the electric vehicle to charge the battery 15.

The charge and discharge unit 25 charges or discharges the electric vehicle battery 15 based on the information on the operation mode determined through the operation mode determination unit 21, the charge reference price inputted through the first input unit 22 and the price of electricity according to time.

The charge and discharge unit 25 may include a device that transforms AC current inputted through the charge and discharge equipment 19 into DC current and charges the battery 15 using the DC current or a device that transforms the DC current of the battery 15 into AC current and transmits the AC current to the charge and discharge equipment 19. Alternatively, the charge and discharge unit 25 may be configured to instruct the battery charge device to charge or discharge the battery 15.

The information on the price of electricity according to time is required for the charge unit 24 and the charge and discharge unit 25 to perform their functions, and the price structure of electricity may be variously configured.

FIG. 11 illustrates an example of the price structure of electricity. FIG. 11A shows time of use pricing (TOU) frequently used in shopping streets, factories, large buildings, and the like. FIG. 11B shows critical peak pricing (CPP) in which prices of electricity are different depending on time zones, and particularly, the price of electricity in a peak zone is very high. FIG. 11C shows real-time pricing (RTP) in which the price of electricity is varied in real time.

The information on the price of electricity according to time may be collected through several paths, and the reception unit 26 performs its function.

As an example, the reception unit 26 may receive the information on the price of electricity according to time, transmitted by the central server 12 through the communication network and transfer the information to the charge unit 24 and the charge and discharge unit 25.

In a case where the meter 13 is a smart meter, it has a communication function with the central server 12. Therefore, the meter 13 may perform the function of reception unit 26 that receives the information on the price of electricity according to time and transfers the information to the charge unit 24 and the charge and discharge unit 25.

As another example, the reception unit 26 may be configured to enable the user 16 to directly input the information on the price of electricity.

That is, in a case where the electric power company 11 informs the user 16 of the information on the price of electricity according to time through a facsimile, a character message, a telephone or the like, or notifies the information on the price of electricity according to time through an Internet website or the like, the user 16 may identify the information on the price of electricity according to time.

Then, the user 16 may directly input the price of electricity according to time.

In this embodiment, the reception unit 26 may provide a user interface (UI) so that the user can input the information on the price of electricity according to time, or may receive the information on the price of electricity according to time from another device such as the user portable terminal 17-1 or IHD 17-2, through which the user can input the information on the price of electricity according to time.

The UI through which the reception unit 26 exchanges the information on the price of electricity according to time with the charge unit 24 and the charge and discharge unit 25 may be variously configured according to the structure of the system.

For example, the reception unit 26, the charge unit 24 and the charge and discharge unit 25 may not be a device integrally configured. In this case, the reception unit 26, the charge unit 24 and the charge and discharge unit 25 may exchange the information on the price of electricity according to time with one another through various communication schemes such as wired and wireless communication schemes.

Figure 2:
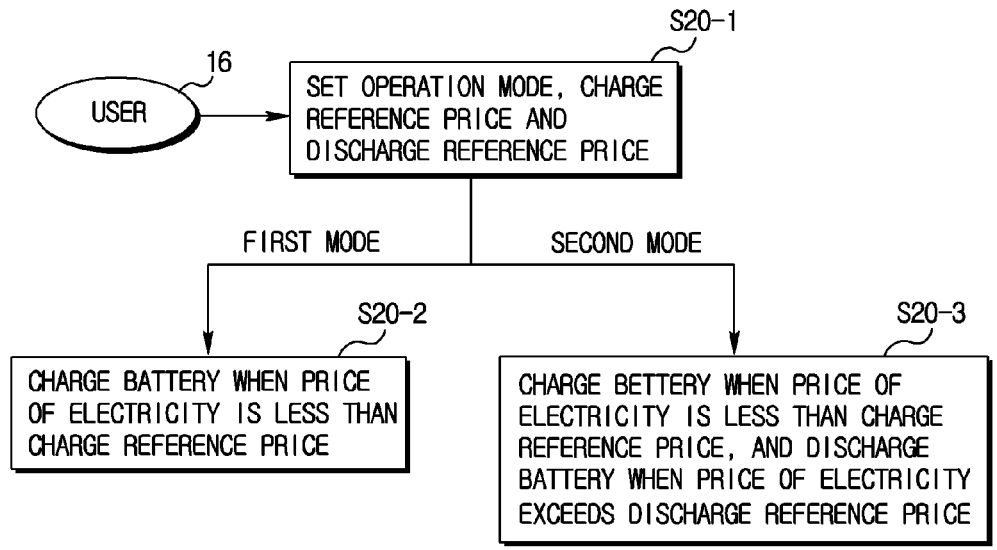
FIG. 2 is a diagram illustrating operations of charge and discharge units in the system according to the present invention.

Operations of the charge unit 24 and the charge and discharge unit 25 will be specifically described with reference to FIG. 2.

First, the user 16 inputs an operation mode through the operation mode determination unit 21, and inputs charge and discharge reference prices through the first and second input units 22 and 23, respectively (S20-1).

The charge unit 24 performs its function when the operation mode set by the user is the first mode, and decides whether the price of electricity is less than the charge reference price. If it is decided that the price of electricity is less than the charge reference price, the charge unit 24 charges the electric vehicle battery 15 (S20-2).

The charge and discharge unit 25 performs its function when the operation mode set by the user is the second mode. If the price of electricity is less than the charge reference price, the charge and discharge unit 25 charges the electric vehicle battery 15, like the charge unit 24. If the price of electricity exceeds the discharge reference value, the charge and discharge unit 25 discharges the electric vehicle battery 15 (S20-3).

Meanwhile, in addition to the charge and discharge reference prices, various pieces of information in addition may be included as charge conditions under which the charge unit 24 and the charge and discharge unit 25 charge the battery 15 and discharge conditions under which the charge and discharge unit 25 discharges the battery 15.

Figure 3:
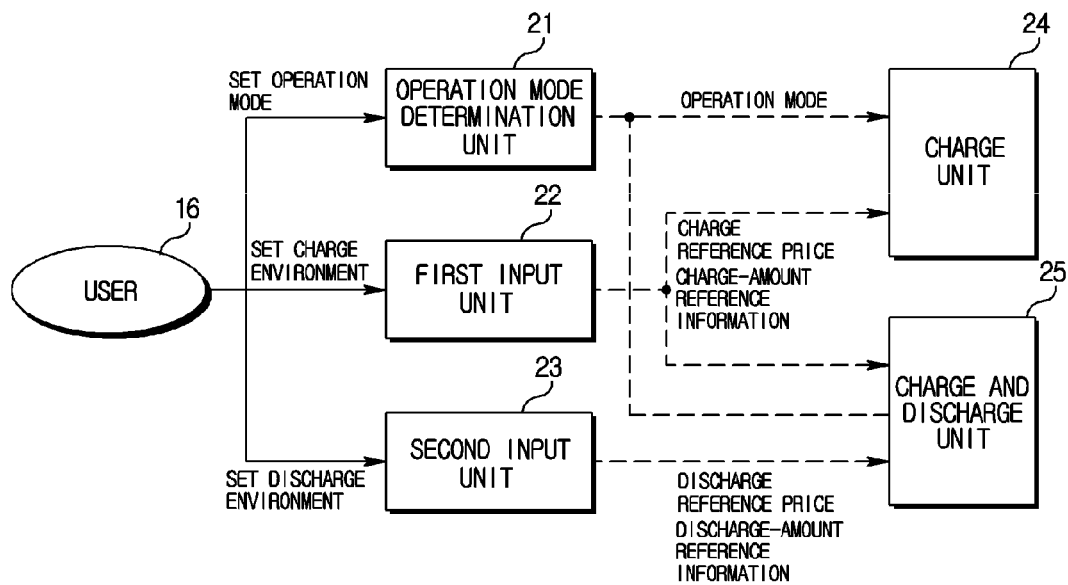
FIG. 3 is a diagram showing an example of inputting charge-amount reference information and discharge-amount reference information together in the system according to the present invention.

Referring to FIG. 3, the user 16 determines the operation mode as the first or second mode through the operation mode determination unit 21.

In addition to the charge reference price, charge-amount reference information may be inputted through the first input unit 22. In addition to the discharge reference price, discharge-amount reference information may be inputted through the second unit 23.

The charge-amount reference information is information for determining to which degree the battery 15 will be charged. The charge-amount reference information includes a target battery charge amount (e.g., a remaining capacity rate of the battery), a target electricity use amount based on which degree of electricity will be used to charge the battery, a target charge rate based on how much electricity will be used to charge the battery, and the like.

The discharge-amount reference information is information for determining to which degree the battery 15 will be discharged. The discharge-amount reference information includes a target battery discharge amount (e.g., a remaining capacity rate of the battery) based on until how much capacity of the battery will remain to discharge the battery, a target electricity discharge amount based on which degree of electricity will be discharged, a target discharge rate based on how much electricity will be discharged, and the like.

Then, the charge unit 24 and the charge and discharge unit 25 charge the electricity vehicle battery 15 in consideration of not only the charge reference price but also the charge-amount reference information.

The charge and discharge unit 25 discharges the electricity vehicle battery 15 in consideration of not only the discharge reference price but also the discharge-amount reference information.

Figure 4:
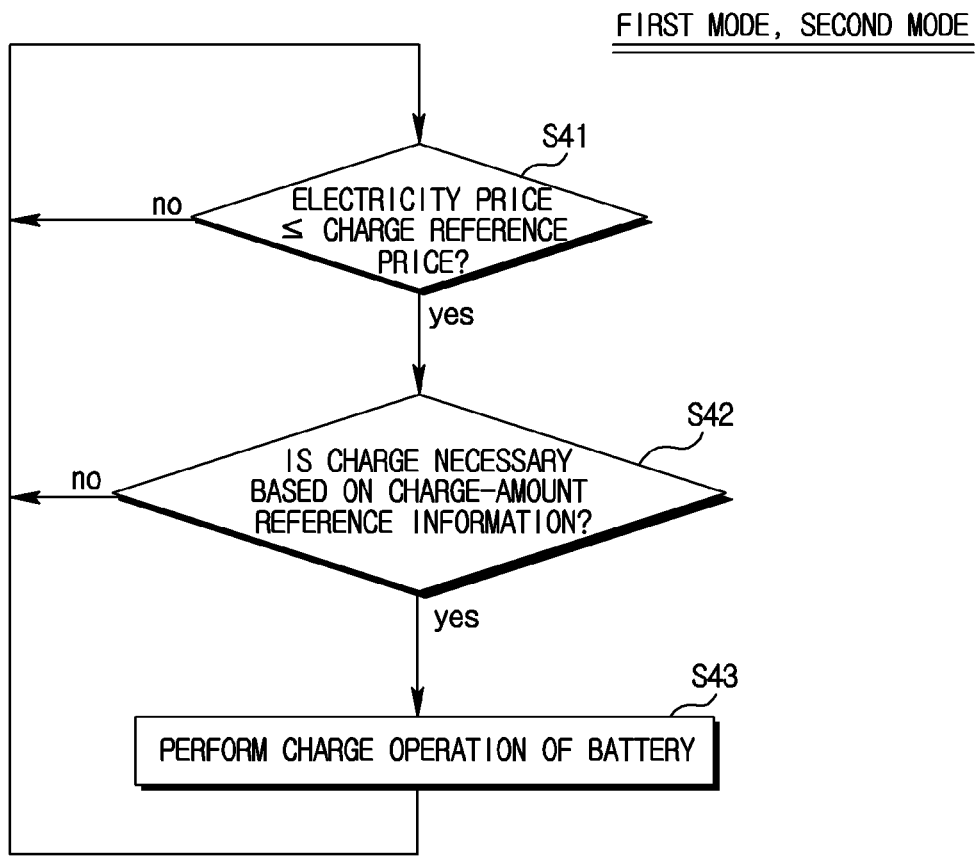
FIG. 4 is a diagram illustrating an charge operation in first and second modes in the system according to the present invention.

Referring to FIG. 4, when the operation mode is the first or second mode, the price of electricity is less than the charge reference price (S41), and the charge unit 24 and the charge and discharge unit 25 charge the battery only when the charge is necessary based on the charge-amount reference information (S42 and S43).

That is, although the price of electricity is less than the charge reference price, the charge unit 24 and the charge and discharge unit 25 charge the battery when the current charge state of the battery 15 does not approach the target battery charge amount, when the amount of electricity used in the charge does not approach the target electricity use amount, and when the rate of electricity used in the charge does not approach the target charge rate. It will be apparent that the various conditions may be combined using 'AND' or 'OR', if necessary.

Figure 5:
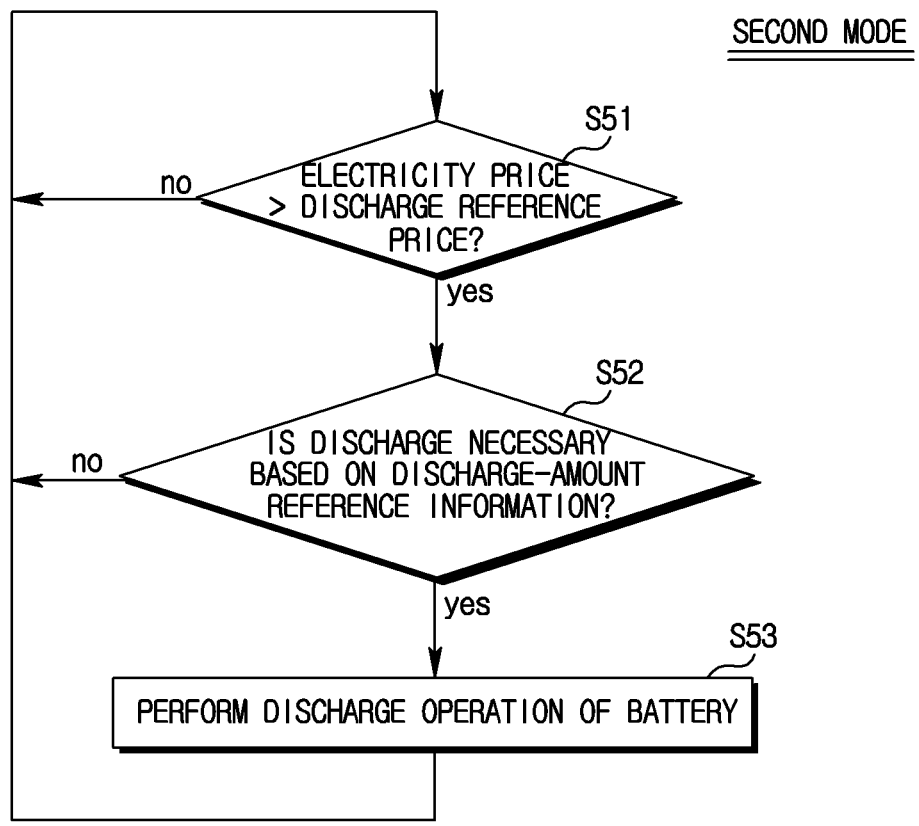
FIG. 5 is a diagram illustrating a discharge operation in the second mode in the system according to the present invention.

Referring to FIG. 5, when the operation mode is the second mode, the price of electricity exceeds the discharge reference price (S51), and the charge and discharge unit 25 discharges the battery only when the discharge is necessary based on the discharge-amount reference information (S52 and S53).

That is, although the price of electricity exceeds the discharge reference price, the charge and discharge unit 25 discharges the battery when the current charge state of the battery 15 is more than the target battery discharge amount, when the amount of electricity discharged does not approach the target electricity discharge amount, and when the rate of electricity obtained by the discharge does not approach the target discharge rate.

It would be apparent that the various conditions may be combined using 'AND' or 'OR', if necessary.

FIG. 6 shows state diagrams in which the charge and discharge are performed on the electric vehicle battery 15 according to the present invention.

FIG. 6A is a state diagram when the operation mode is the second mode. When charge conditions are satisfied, the discharge state is switched to the charge state. When discharge conditions are satisfied, the charge state is switched to the discharge state. When the charge and discharge states are not all satisfied, the sate that the charge and discharge are not performed is maintained.

FIG. 6B is a state diagram when the operation mode is the first mode. When the charge conditions are satisfied, the maintenance state is switched to the charge state. When the charge conditions are not satisfied, the sate that the charge and discharge are not performed is maintained.

FIG. 6C is a state diagram when the operation mode is not the first or second mode but is a general mode. In this state, the sate that the charge and discharge are not performed is maintained.

The system may further include the measurement unit 27 that calculates the electricity use amount or electricity rate when the electricity vehicle battery 15 is charged or discharged.

The measurement unit 27 performs the function of a gauge that calculates the rate of electricity used to charge the electricity vehicle battery 15 or the rate of electricity collected from the electricity vehicle battery 15 and transmitted to an energy consuming place or electric power company.

Particularly, the measurement unit 27 may be configured using a smart meter. The measurement unit 27 may be installed in a place capable of detecting electric energy transferred to the electricity vehicle battery 15 or discharged from the electricity vehicle battery 15.

As described above, the charge unit 24 and the charge and discharge unit 25 may require information on the amount and rate of electricity generated due to the charge and discharge of the battery 15, including the target electricity use amount, the target charge rate, the target electricity discharge amount, the target discharge rate and the like, in addition to the charge or discharge reference price.

Therefore, in the embodiment in which the charge unit 24 and the charge and discharge unit 25 require information on the amount or rate of electricity, the measurement unit 27 may be configured to transfer the amount and rate of electricity to the charge unit 24 and the charge and discharge unit 25.

The measurement unit 27 may also estimate the electricity rate in the charge or discharge using the capacity of the electricity vehicle battery.

That is, the measurement unit 27 may detect information on the remaining capacity of the electric vehicle battery 15, and may previously estimate the rate of electricity required in the charge or the rate of electricity to be generated in the discharge based on the current price of electricity.

As an example, it is assumed that when the current remaining capacity rate of the battery is 60% and the battery is completely charged, the electricity amount is Qmax. Then, the measurement unit 27 may estimate the electricity rate required in the charge by multiplying the electricity amount of 'Qmax×0.4' by the unit price of electricity, and may estimate the electricity rate to be generated in the discharge by multiplying the electricity amount of 'Qmax×0.6' by the unit price of electricity.

The measurement unit 27 may estimate in advance the electricity rate required in the charge or the electricity rate to be generated in the discharge based on the charge and discharge reference prices, or may estimate in advance the electricity rate to be received from the electric power company in the discharge.

In the aforementioned example, the electricity rate required in the charge may be estimated by multiplying the electricity amount of 'Qmax×0.4' by the charge reference price, and the electricity rate to be generated in the discharge may be estimated by multiplying the electricity amount of 'Qmax×0.6' by the discharge reference price.

The electricity rate to be received from the electric power company in the discharge may be identical to the electricity rate to be generated in the discharge. Alternatively, the sales price of electricity particularly set between the user and the electric power company may be applied to the electricity rate, or the actual amount of money after taxes, to be received by the user, may be estimated as the electricity rate.

The measurement unit 27 may estimate in advance various pieces of information in addition to the electricity amount or electricity rate in the state that the charge or discharge is performed.

The transmission unit 28 functions to transmit various pieces of information related to the operation of the system to other devices.

In this instance, the transmission of the information may be performed using various wired or wireless communication methods, or the information may be transmitted through a broadband communication network such as a mobile communication network.

Information calculated or estimated by the measurement unit 27 may be used as an example of the information transmitted by the transmission unit 28. Specifically, information on the electricity rate related to the charge or discharge of the electric vehicle battery 15, the estimated electricity rate in the charge and discharge, or the electricity rate to be received from the electric power company may be used as an example of the information transmitted by the transmission unit 28.

The transmission unit 28 may transmit the information to the central server 12, the user portable terminal 17-1, the IHD 17-2, or the like.

The measurement unit 27 may be configured to monitor whether the amount or rate of electricity used to charge the electric vehicle battery 15 for a specific period of time exceeds a predetermined maximum value.

In this case, if it is monitored by the measurement unit 27 that the amount or rate of electricity used to charge the electric vehicle battery 15 exceeds the predetermined maximum value, the transmission unit 28 may transmit a warning message to the user portable terminal 17-1 or IHD 17-2.

The maximum value may be set by the user. In a case where the discharge is performed, the measurement unit 27 may determine whether only the electricity rate obtained by subtracting the electricity rate generated in the discharge from the electricity rate used in the charge exceeds the maximum value.

Figure 7:
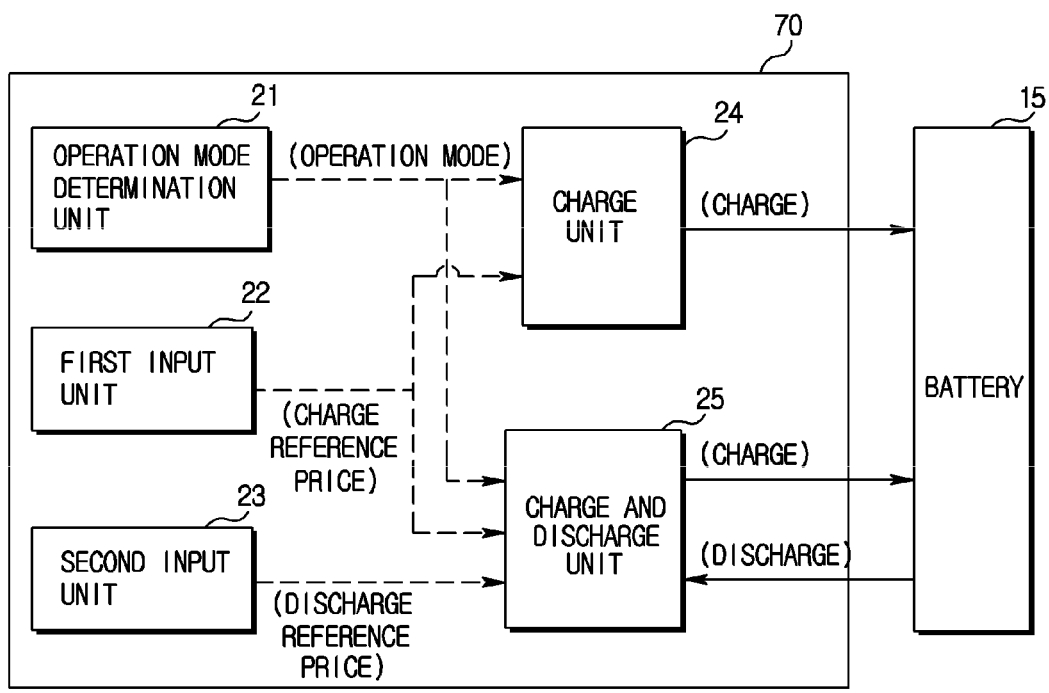
FIGS. 7 and 8 are block diagrams showing embodiments of an apparatus for controlling charge and discharge of an electric vehicle according to the present invention.

FIG. 7 shows an embodiment of an apparatus 70 for controlling charge and discharge of an electric vehicle according to the present invention. The apparatus 70 includes an operation mode determination unit 21, a first input unit 22, a second input unit 23, a charge unit 24 and a charge and discharge unit 25.

Figure 8:
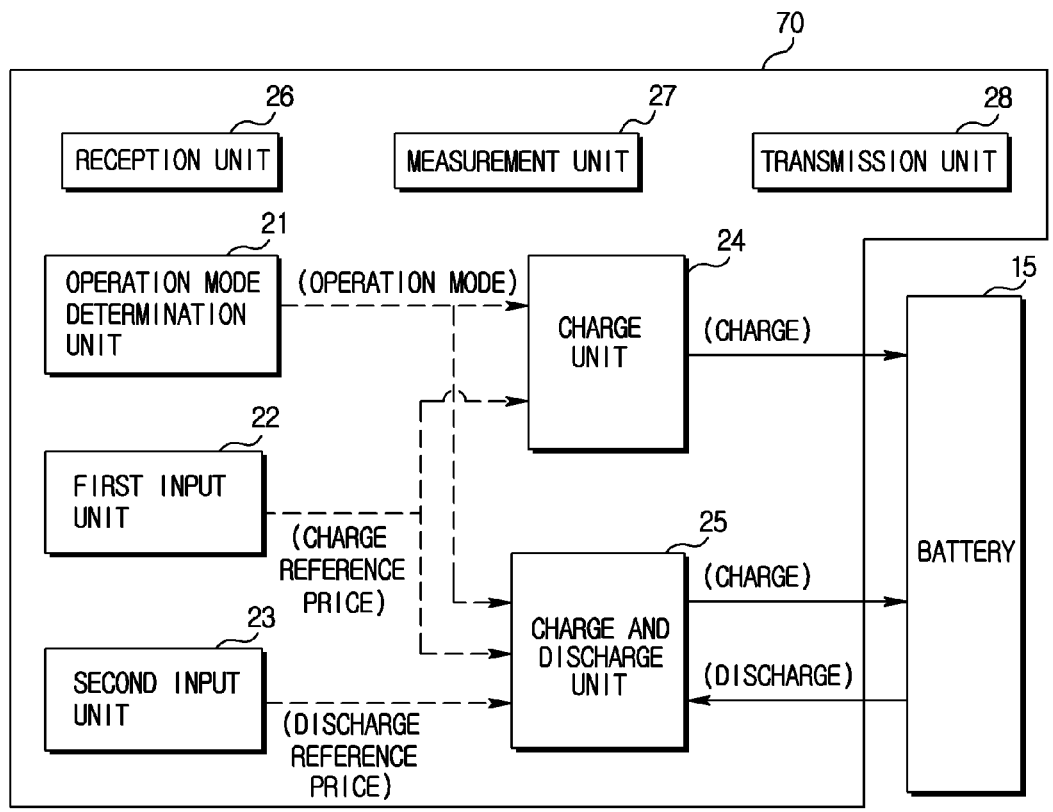

Referring to FIG. 8, the apparatus 70 according to the present invention may further include one or more combinations of a reception unit 26, a measurement unit 27 and a transmission unit 28.

In the apparatus 70 according to the present invention, functions of the operation mode determination unit 21, the first input unit 22, the second input unit 23, the charge unit 24, the charge and discharge unit 25, the reception unit 26, the measurement unit 27 and the transmission unit 28 are identical to those of the system described above. Therefore, overlapping descriptions will be omitted, and only main points will be described.

The operation mode determination unit 21 enables a user to input operation mode information according to the operation scheme of the electric vehicle.

The operation mode includes a first mode and a second mode. The first mode is a mode informing that the electric vehicle will be operated on occasion, and the second mode is a mode informing that the electricity vehicle will not operated for a quite time due to several reasons such as a business trip or a journey.

The first input unit 22 enables the user to input a charge reference price that is the price of electricity, with which the electricity vehicle battery 15 is to be charged. The second input unit 23 enables the user to input a discharge reference price that is the price of electricity, with which the electricity vehicle battery 15 is to be discharged.

The operation mode determination unit 21, the first input unit 22 and the second input unit 23 may be variously configured as components that interface with the user.

Information on the operation mode, the charge reference price and the discharge reference price, respectively inputted by the user through the operation mode determination unit 21, the first input unit 22 and the second input unit 23, are transferred to the charge unit 24 and the charge and discharge unit 25.

The charge unit 24 charges the electric vehicle battery 15 based on the information on the operation mode determined through the operation mode determination unit 21, the charge reference price inputted through the first input unit 22 and the price of electricity according to time.

The charge and discharge unit 25 charges or discharges the electric vehicle battery 15 based on the information on the operation mode, the charge and discharge reference price and the price of electricity according to time.

The information on the price of electricity according to time is required for the charge unit 24 and the charge and discharge unit 25 to perform their functions, and the price structure of electricity may be variously configured as shown in the example of FIG. 11.

The information on the price of electricity according to time may be collected through several paths, and the reception unit 26 may perform its function.

As an example, the reception unit 26 may receive the information on the price of electricity according to time, transmitted by the central server 12 through the communication network and transfer the information to the charge unit 24 and the charge and discharge unit 25.

As another example, the reception unit 26 may be configured to enable the user to directly input the information on the price of electricity.

In this embodiment, the reception unit 26 may provide a UI so that the user can input the information on the price of electricity according to time, or may receive the information on the price of electricity according to time from another device such as a user portable terminal 17-1 or IHD 17-2, through which the user can input the information on the price of electricity according to time.

The UI through which the reception unit 26 exchanges the information on the price of electricity according to time with the charge unit 24 and the charge and discharge unit 25 may be variously configured according to the structure of the system. For example, the reception unit 26, the charge unit 24 and the charge and discharge unit 25 may not be a device integrally configured. In this case, the reception unit 26, the charge unit 24 and the charge and discharge unit 25 may exchange the information on the price of electricity according to time with one another through various communication schemes such as wired and wireless communication schemes.

As described with reference to FIG. 2, the charge unit 24 performs its function when the operation mode set by the user is the first mode. When the price of electricity is less than the charge reference price, the charge unit 24 charges the electric vehicle battery 15.

The charge and discharge unit 25 performs its function when the operation mode set by the user is the second mode. If the price of electricity is less than the charge reference price, the charge and discharge unit 25 charges the electric vehicle battery 15, like the charge unit 24. If the price of electricity exceeds the discharge reference value, the charge and discharge unit 25 discharges the electric vehicle battery 15.

In addition to the charge and discharge reference prices, various pieces of information in addition may be included as charge conditions under which the charge unit 24 and the charge and discharge unit 25 charge the battery 15 and discharge conditions under which the charge and discharge unit 25 discharges the battery 15.

Specifically, as described with reference to FIG. 3, charge-amount reference information, discharge-amount reference information or the like may be included as the charge and discharge conditions.

Then, the charge unit 24 and the charge and discharge unit 25 charge the electricity vehicle battery 15 in consideration of not only the charge reference price but also the charge-amount reference information. The charge and discharge unit 25 discharges the electricity vehicle battery 15 in consideration of not only the discharge reference price but also the discharge-amount reference information.

The measurement unit 27 calculates the electricity use amount or electricity rate when the electricity vehicle battery 15 is charged or discharged.

That is, the measurement unit 27 performs the function of a gauge that calculates the amount or rate of electricity used to charge the electricity vehicle battery 15 or the amount or rate of electricity collected from the electricity vehicle battery 15 and transmitted to an energy consuming place or electric power company.

The measurement unit 27 may be configured using a smart meter. The measurement unit 27 may be installed in a place capable of detecting electric energy transferred to the electricity vehicle battery 15 or discharged from the electricity vehicle battery 15.

As described above, the charge unit 24 and the charge and discharge unit 25 may require information on the amount and rate of electricity generated due to the charge and discharge of the battery 15, including the target electricity use amount, the target charge rate, the target electricity discharge amount, the target discharge rate and the like, in addition to the charge or discharge reference price.

Therefore, in the embodiment in which the charge unit 24 and the charge and discharge unit 25 require information on the amount or rate of electricity, the measurement unit 27 may be configured to transfer the amount or rate of electricity to the charge unit 24 and the charge and discharge unit 25.

The measurement unit 27 may also estimate the electricity rate in the charge or discharge using the capacity of the electricity vehicle battery.

That is, the measurement unit 27 may detect information on the remaining capacity of the electric vehicle battery 15, and may previously estimate the rate of electricity required in the charge or the rate of electricity to be generated in the discharge based on the price of electricity.

The measurement unit 27 may estimate in advance the electricity rate required in the charge or the electricity rate to be generated in the discharge based on the charge and discharge reference prices, or may estimate in advance the electricity rate to be received from the electric power company in the discharge.

The transmission unit 28 functions to transmit various pieces of information related to the operation of the system to other devices.

In this instance, the transmission of the information may be performed using various wired or wireless communication methods, or the information may be transmitted through a broadband communication network such as a mobile communication network.

Information calculated or estimated by the measurement unit 27 may be used as an example of the information transmitted by the transmission unit 28.

Specifically, information on the electricity rate related to the charge or discharge of the electric vehicle battery 15, the estimated electricity rate in the charge and discharge, or the electricity rate to be received from the electric power company may be used as an example of the information transmitted by the transmission unit 28.

The transmission unit 28 may transmit the information to the central server 12, the user portable terminal 17-1, the IHD 17-2, or the like.

The measurement unit 27 may be configured to monitor whether the amount or rate of electricity used to charge the electric vehicle battery 15 for a specific period of time exceeds a predetermined maximum value.

In this case, if it is monitored by the measurement unit 27 that the amount or rate of electricity used to charge the electric vehicle battery 15 exceeds the predetermined maximum value, the transmission unit 28 may transmit a warning message to the user portable terminal 17-1 or IHD 17-2.

FIG. 9 illustrates various configurations of the apparatus 70 according to the present invention, which may be applied to the system as it is.

FIG. 9A shows an example in which the components of the apparatus 70 are all provided in the interior of an electric vehicle 91. The apparatus 70 may be configured to allow the user to input information related to the charge and discharge conditions such as the operation mode, the charge reference price and the discharge reference price using an UI provided in the interior of the electric vehicle 91.

If a power source plug 91-1 of the electric vehicle 91 is connected to the charge and discharge equipment 19, the charge unit 24 and the charge and discharge unit 25 charge the battery 15 or collects electrical energy by discharging the battery 15 based on the information inputted by the user.

FIG. 9B shows an example in which the charge unit 24 and the charge and discharge unit 25 of the apparatus 70 are positioned in the interior of the electric vehicle 91, and the operation mode determination unit 21, the first input unit 22 and the second input unit 23 are positioned at the exterior of the electric vehicle 91.

Specifically, FIG. 9B shows that the UI that enables the user to input the operation mode, the charge reference price and the discharge reference price respectively through the operation mode determination unit 21, the first input unit 22 and the second input unit 23 may be provided to the exterior of the electric vehicle 91.

The UI may be provided through a device such as the user portable terminal 17-1 or IHD 17-2, or from the charge and discharge equipment 19, or may be provided through a personal computer (PC), a TV set or the like, which is connected to the home network of an energy consuming place.

The operation mode, the charge reference price, the discharge reference price and the like, which are inputted using the UI as described above, may be transferred to the charge unit 24 and the charge and discharge unit 25 using various communication methods.

Then, the charge unit 24 charges the battery 15 or the charge and discharge unit 25 collect electric energy by discharging the battery 15 based on the information set by the user.

The charge unit 24 or the charge and discharge unit 25 may not be necessarily positioned at the interior of the electric vehicle 91.

That is, although the charge unit 24 and the charge and discharge unit 25 are positioned at the exterior of the electric vehicle 91, it is sufficient that the path (e.g., the charge and discharge equipment), through which the electric vehicle battery 15 is charged and discharged, can be connected or opened or that the management state of the battery 15 can be controlled as a charge or discharge state.

Figure 10:
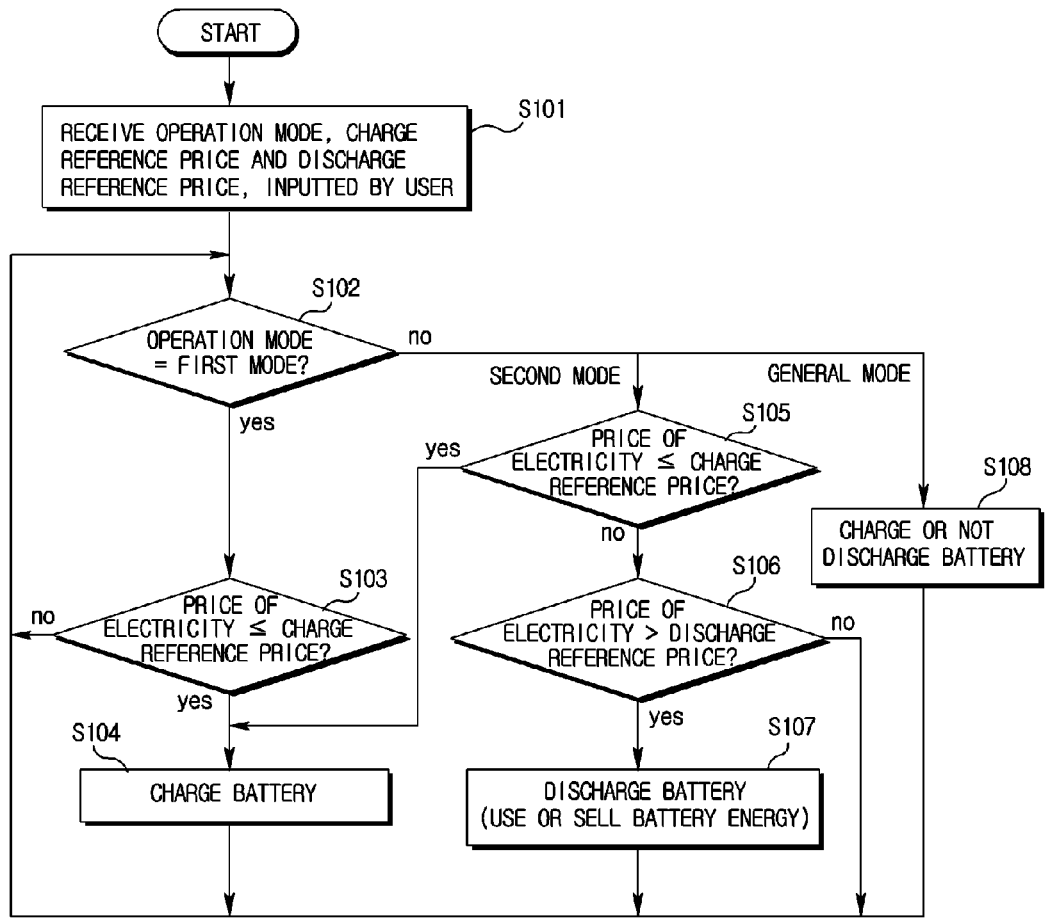
FIG. 10 is a flowchart illustrating an embodiment of a method for controlling charge and discharge of an electric vehicle according to the present invention.

An embodiment of a method for controlling charge and discharge of an electric vehicle according to the present invention will be described with reference to FIG. 10.

First, information on an operation mode, a charge reference price and a discharge reference price is received from a user (S101).

The operation mode includes a first mode and a second mode. The first mode is a mode informing that the electric vehicle will be operated on occasion, and the second mode is a mode informing that the electricity vehicle will not operated for a quite time due to several reasons such as a business trip or a journey.

At the step S101, a UI for receiving the information on the operation mode, the charge reference price, the discharge reference price, inputted from the user, may be provided to the interior of the electric vehicle, or may configured to enable the information to be inputted from the exterior of the electric vehicle through a user portable terminal or IHD.

The information on the operation mode, the charge reference price and the discharge reference price, inputted by the user at the step S101, are maintained until the information is renewed.

If the operation mode inputted by the user at the step S101 is the first mode (S102), it is decided whether the price of electricity is less than the charge reference price (S103). When it is decided that the price of electricity is less than the charge reference price, an electric vehicle battery is charged (S104).

It will be apparent that the charge of the battery at the step S104 can be performed only when the current battery is not completely charged.

If the operation mode inputted by the user at the step S101 is the second mode (S102), it is decided whether the price of electricity is less than the charge reference price (S105). When it is decided that the price of electricity is less than the charge reference price, the electric vehicle battery is charged (S104).

However, if the price of electricity is not less than the charge reference price, it is decided whether the price of electricity exceeds the discharge reference price (S106). If the price of electricity exceeds the discharge reference price, the electric vehicle battery is discharged (S107).

If the operation mode is not any one of the first and second modes or if the price of electricity exceeds the charge reference price and is less than the discharge reference price, the operation of charging or discharging the battery is not performed (S108).

Information on the price of electricity according to time is necessary to decide whether to charge the battery at the step S104 or to discharge the battery at the step S107.

As described with reference to FIG. 11, the price structure of electricity according to time may be variously configured as the TOU, CPP, RTP and the like. The price of electricity may be collected through various paths.

For example, the information on the price of electricity according to time may be received from a central server or may be directly inputted by the user.

Although charge conditions for charging the battery at the step S104 and discharge conditions for discharging the battery at the step 107 are based on the charge reference price and the discharge reference price, the charge and discharge conditions may be variously configured, if necessary.

For example, the charge-amount reference information and the discharge-amount reference information, described above, may be used as the charge and discharge conditions. The charge-amount reference information and the discharge-amount reference information are inputted by the user at the step S101.

At the steps S103 and S105, as described through FIG. 4, it is decided whether to charge the electricity vehicle battery 15 in consideration of not only the charge reference price but also the charge-amount reference information. At the step S106, it is decided whether to discharge the electricity vehicle battery 15 in consideration of not only the discharge reference price but also the discharge-amount reference information.

That is, the charge of the battery at the step S104 is performed only when the price of electricity is less than the charge reference price and the charge is necessary based on the charge-amount reference information. The discharge of the battery at the step S107 is performed only when the price of electricity exceeds the discharge reference price and the discharge is necessary based on the discharge-amount reference information.

The method according to the present invention may further include a measurement step of calculating the amount or rate of electricity required in the charge at the step S104 or the amount or rate of electricity generated in the discharge at the step S107.

The measurement step may be performed by a smart meter.

The measurement step may estimate in advance the amount or rate of electricity in the charge and discharge. That is, the measurement step may detect information on the remaining capacity of the electric vehicle battery, and may estimate the amount or rate of electricity required in the charge or the amount or rate of electricity to be generated in the discharge using the information.

The measurement step may estimate the amount or rate of electricity required in the charge or the amount or rate of electricity to be generated in the discharge based on the charge and discharge reference prices inputted by the user at the step S101. The measurement step may estimate the electricity rate to be received from an electric power company in the discharge based on the information on the remaining capacity of the battery and the discharge reference price.

If various pieces of information related to the charge and discharge of the electric vehicle are calculated or estimated at the measurement step, they may be transmitted to other devices.

For example, the information on the amount or rate of electricity related to the charge and discharge of the electric vehicle, calculated or estimated at the measurement step, information on the previously estimated electricity rate to be received by the electric power company, and the like may be transmitted to the central server, the user portable terminal, IHD, or the like.

The measurement step may be configured to monitor whether the amount or rate of electricity used to charge the electric vehicle battery for a specific period of time exceeds a predetermined maximum value.

In this case, if it is monitored that the amount or rate of electricity used to charge the electric vehicle battery exceeds a predetermined maximum value, a warning message may be transmitted to the user portable terminal or IHD.

The maximum value may be set by the user. In a case where the discharge is performed, it may be determined whether only the electricity rate obtained by subtracting the electricity rate generated in the discharge from the electricity rate used in the charge exceeds the maximum value.

As described above, the present invention has advantages or effects as follows.

When the price of electricity is cheap under variable pricing, the electric vehicle battery can be charged.

In a case where there is no plan of operating the electricity vehicle for a quite time, it is wasteful to maintain electric energy in the electric vehicle. Thus, the electric energy in the electric vehicle can be used to operate other electric devices provided at an energy consuming plate such as a household or office.

Accordingly, the electricity rate can be saved by reducing electric energy consumption at the energy consuming place. Furthermore, it is possible to obtain economic benefit by reselling remaining electric energy to the electric power company.

Particularly, in the current situation that several vehicles are provided to one household, the electric vehicle battery is used as an energy supply source, so that it is possible to save a considerable amount of electric energy throughout the whole society. When a large amount of electric energy is required, remaining electric energy can be used as preliminary electric energy. Further, it can be expected to limit the extension of installation of general power plants.

The aforementioned embodiments should be construed to be provided for illustrative purposes so that those skilled in the art can fully understand the spirit of the present invention. Accordingly, it would be appreciated by those skilled in the art that changes may be made in this embodiment without departing from the principles and spirit of the invention, the scope of which is defined in the claims and their equivalents.

What is claimed is:

1. A system for controlling charge or discharge of a battery of an electric vehicle, the system comprising:
   a receiver configured to:
      receive information related to a price of electricity according to time from a central server;
      receive an operation mode from a portable terminal or an in home display (IHD), the operation mode including a first mode in which the electric vehicle is operated after the battery is charged and a second mode in which the electric vehicle is not operated after the battery is charged; and
      receive a first price under which the battery of the electric vehicle is charged and a second price over which the battery of the electric vehicle is discharged, the first and second price being received from the portable terminal or the IHD;
   a transmitter configured to transmit information to at least the central server, the portable terminal, or the IHD;
   a charger configured to charge the battery;

a discharger configured to discharge the battery; and
a controller configured to:
  control the charger to charge the battery when the electric vehicle is in the first mode and the price of electricity is under the first price;
  control the charger to charge the battery when the electric vehicle is in the second mode and the price of electricity is under the first price;
  control the discharger to discharge the battery when the electric vehicle is in the second mode and the price of electricity is over the second price;
  calculate cost of electricity for charging or discharging the battery;
  estimate a total cost of electricity to be received from an electric power company for discharging the battery based on the information related to a price of electricity according to time; and
  monitor whether the calculated cost for charging or discharging the battery for a specific period of time exceeds a threshold cost;
  control the transmitter to transmit information related to the calculated cost of electricity or the estimated total cost of electricity to at least the central server, the portable terminal, or the IHD; and
  control the transmitter to transmit a warning message to at least the portable terminal or the IHD when the controller determines that the calculated cost for charging or discharging the battery for the specific period of time exceeds the threshold cost.

2. The system of claim 1, wherein the controller is further configured to control the charger to charge the battery according to charge-amount reference information received from the portable terminal or the IHD.

3. The system of claim 1, wherein the controller is further configured to control the discharger to discharge the battery according to a discharge-amount reference information received from the portable terminal or the IHD.

4. A method for controlling charge or discharge of a battery of an electric vehicle, the method comprising:
  receiving information related to a price of electricity according to time from a central server;
  receiving an operation mode from a user's portable terminal or an in home display (IHD), the operation mode including a first mode in which the electric vehicle is operated after the battery is charged and a second mode in which the electric vehicle is not operated after the battery is charged;
  receiving a first price under which the battery of the electric vehicle is charged and a second price over which the battery of the electric vehicle is discharged, the first and second price being received from the portable terminal or the IHD;
  charging the battery when the electric vehicle is in the first mode and the price of electricity is under the first price or when the electric vehicle is in the second mode and the price of electricity is under the first price;
  discharging the battery when the electric vehicle is in the second mode and the price of electricity is over the second price;
  calculating cost of electricity for charging or discharging the battery;
  estimating a total cost of electricity to be received from an electric power company for discharging the battery based on the information;
  transmitting information related to the calculated cost of electricity or the estimated total cost of electricity to at least the central server, the portable terminal, or the IHD;
  monitoring whether the calculated cost for charging or discharging the battery for a specific period of time exceeds a threshold cost; and
  transmitting a warning message to at least the portable terminal or the IHD when the calculated cost for charging or discharging the battery for the specific period of time exceeds the threshold cost.

5. The method of claim 4, further comprising:
  receiving charge-amount reference information from the portable terminal or the IHD; and
  charging the battery according to the charge-amount reference information.

6. The method of claim 4, further comprising:
  receiving discharge-amount reference information from the portable terminal or the IHD; and
  discharging the battery according to the discharge-amount reference information.

7. The method of claim 4, wherein at least the total cost is estimated using information related to a capacity of the battery.

* * * * *